Sept. 22, 1936.  G. D. GARDNER  2,055,075
CAN FILLING MACHINE
Filed March 6, 1934
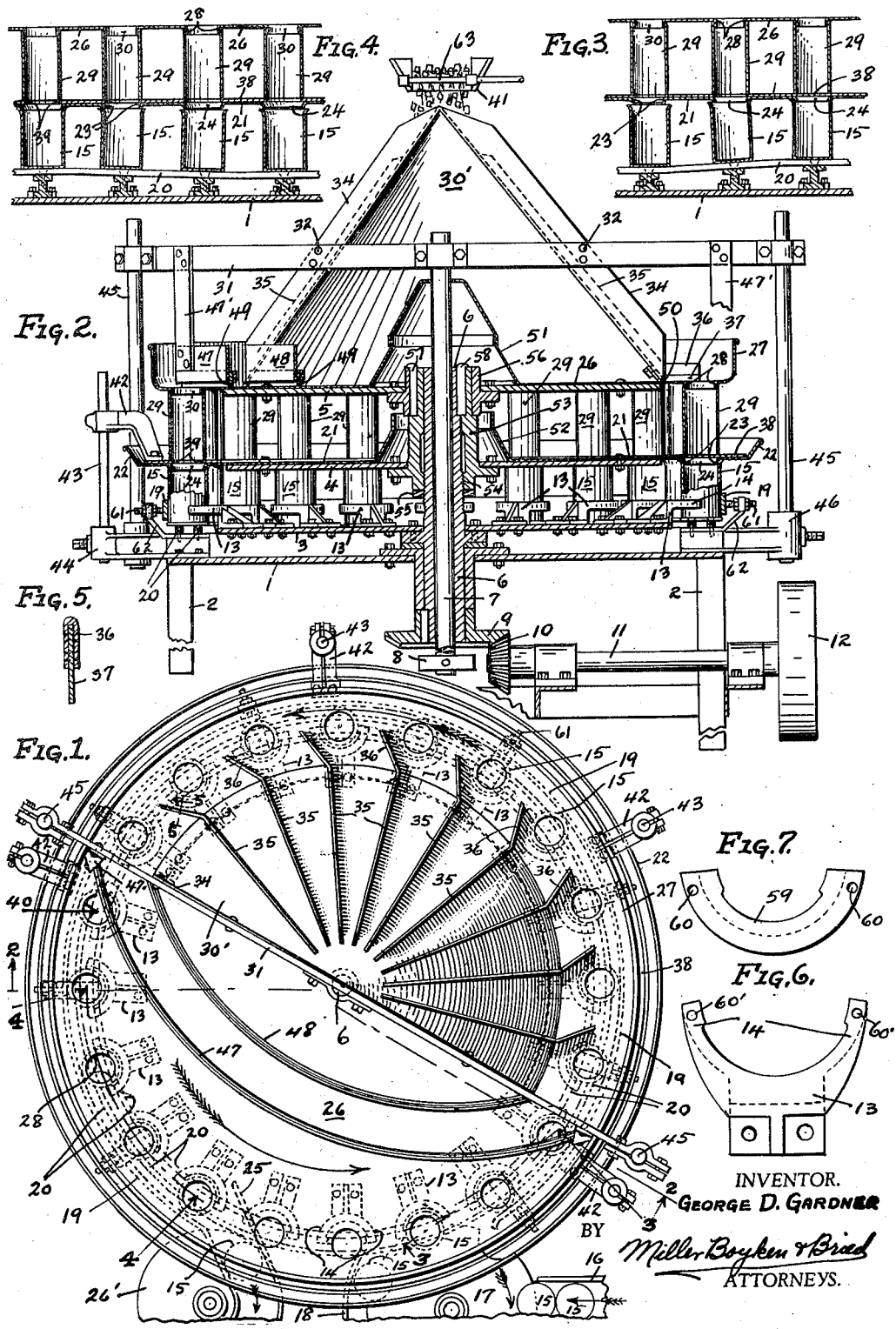
INVENTOR.
GEORGE D. GARDNER
BY
Miller Boyken & Bried
ATTORNEYS.

UNITED STATES PATENT OFFICE 2,055,075

CAN-FILLING MACHINE

George D. Gardner, San Jose, Calif.

Application March 6, 1934, Serial No. 714,257

8 Claims. (Cl. 226—96)

This invention relates to can filling apparatus and has for one of its objects the provision of improved means for accurately and rapidly filling cans with fruit, vegetables and the like. Another object is the provision of means for adapting the apparatus to cans of different sizes, and a still further object is the provision of means for adapting the apparatus to use with either cooked or uncooked fruit. Other objects and advantages will appear in the specification.

In the drawing, Fig. 1 represents a plan view of the apparatus with parts of the feeding conveyor for the cans and the discharge conveyor broken away to fit the sheet.

Fig. 2 is a sectional view of the apparatus as seen along the line of 2—2 of Fig. 1.

Fig. 3 is a fragmentary sectional view of a portion of the apparatus taken along the line 3—3 of Fig. 1.

Fig. 4 is a fragmentary view of a portion of the apparatus taken along the line 4—4 of Fig. 1.

Fig. 5 is an enlarged sectional view of the end portion of the guide fins of the apparatus as taken along the line 5—5 of Fig. 1.

Fig. 6 is an enlarged plan view of the can driving lugs of the apparatus.

Fig. 7 is an enlarged plan view of a filler or insert adapted to be attached to the can driving lug for adapting the lug to drive a smaller sized can.

Briefly described, my apparatus comprises a circular horizontally disposed disk with a row of vertically directed openings around its margin adapted to register with the open tops of a row of cans positioned therebeneath, the cans and disk being arranged to revolve together around a central axis. Over a disk is positioned a stationary hemi-conically shaped member with its base adjacent the disk and provided with distributor fins on its outer surface extending in a direction generally radially of the axis of the cone from about the apex to the base edge thereof with the ends of the fins at the base extended over the plate and terminating at about a line extending through the centers of the row of openings. A suitable conveyor feeds pieces of the fruit or vegetables onto the cone adjacent the apex and is guided and distributed down the outer side of the cone by the fins to over the openings in the disk to drop therethrough directly into the cans for filling the same when uncooked fruit is being used. Means is also provided for directing excess fruit away from the openings in the disk when the cans are filled to the proper height.

When cooked fruit is used, I provide an auxiliary disk spaced above the above mentioned disk with a row of openings therein adapted to register with the openings in the first mentioned disk and provided with vertically extending tubular members extending between the openings in the two disks. This auxiliary disk is mounted to revolve with the cans and first mentioned disk.

The hemi-conically shaped member with the fins is positioned above the auxiliary plate to function in the same manner as already described for directing the fruit directly into the cans, only in this instance the fruit drops through the openings in the auxiliary disk and into the tubular members and from there into the cans.

A stationary plate is interposed between the tubular members and open upper ends of the cans over a portion of the path of the cans so as to obstruct the passage of the fruit directly into the cans over that portion of the travel of the cans, thus enabling each of the tubular members to be filled with a charge of fruit sufficient to fill the can therebeneath.

Over the remaining portion of travel of the cans the stationary plate has openings or it may be entirely eliminated, thus permitting the charge of fruit in each of the tubular members to drop into the can as the cans and tubular members revolve to pass the unobstructed position of the plate.

By the above described means, cooked or uncooked fruit may be continuously fed onto the cone and automatically slides down its outer side into the cans or can-charging tubular member with little or no attention on the part of the operator, and the cans are automatically filled to the proper height and removed from the apparatus for subsequent operations.

It is obvious from the foregoing that cans already partially filled may be fed to my apparatus for further filling, since the cans are fed along a horizontal path only, and no can-exhausting operations are necessary for removing water or other undesirable material.

In charging the cans with green or uncooked fruit, I may provide for ejecting a fine dilute spray of syrup onto the cone adjacent the discharge of fruit thereto for coating the particles of fruit with syrup. This tends to not only lubricate the fruit, as it were, to render it slippery so that the pieces will not stick on the cone, and will readily slide down the cone, but it also insures a solid pack of green fruit, since the syrup will fill the interstices between the fruit as it drops into the cans, preventing the formation of air pockets.

The drawing indicates my apparatus as arranged for use of cooked fruit, and inasmuch as its adaptation for green or uncooked fruit is thought to be obvious from the drawing and description, it is not thought necessary to complicate the drawing with other drawings in which the auxiliary disk and tubular members are removed. The apparatus with the auxiliary disk and tubular members may, of course, be used for uncooked food, but, as the cooked fruit is heavier than uncooked fruit, it tends to drop more readily from the tubular members into the cans than the uncooked fruit; therefore, I prefer to direct the uncooked fruit directly into the cans.

In detail, my apparatus comprises a stationary frame 1 provided with legs 2 mounting the can filling structure. Over said frame are three spaced superposed relatively rigid circular disks 3, 4, 5, centrally secured to an elongated vertically extending rotatable tubular hub 6 for rotation therewith. A shaft 7 fixed at its lower end to the frame or floor by suitable means 8, extends through the hub and projects above the disks at its extreme upper end.

The hub 6 is rotated by means of a driven gear 9 keyed to the lower end of the hub and meshing with a gear 10 secured on a drive shaft 11 that carries a pulley 12.

The lowermost disk 3 is the can driving disk, and is provided around its periphery with a row of equally spaced radially outwardly extending can driving lugs 13, each lug being generally in the form of a radially outwardly opening yoke with arms 14 adapted to partially embrace one of the cans 15.

The cans 15 are fed to one side of the disk from a suitable conveyor 16 by means of a rotatably driven feed wheel 17 having spaced recesses around its periphery for engaging the cans and conveying them between the wheel and a guide 18 to the can driving lugs on disk 3. The wheel 17 and can driving disk 3 are connected to be driven at suitable relative speeds so that each of the cans engaged by the wheel will be picked up by the successive can driving lugs on disk 3 as the disk nd wheel are rotated.

Upon engagement of the cans by the driving lugs, the cans are retained between the arms of the lugs by a horizontally disposed circular guide 19 bearing against the sides of the cans opposite the lugs, and the cans are slidably supported on a pair of concentrically disposed horizontally positioned tracks 20.

Spaced above disk 3 is disk 4, and spaced above disk 4 is disk 5. Secured to the upper side of disk 4 is a relatively light circular sheet metal plate 21 terminating at its outer edge in an upwardly directed flange 22. This plate is provided around its horizontal margin outwardly of the edge of disk 4 with a plurality of openings 23, each of the openings being disposed directly over one of the cans supported on the tracks therebeneath.

The edge of each opening 23 is formed with a slight downwardly directed flange 24 of a size to just fit within the open upper end of the can therebelow.

In order to engage the flanges 24 within the cans, the can supporting tracks 20 adjacent the feed wheel 17 are of reduced elevation so that the cans will easily pass beneath the flanges. The tracks then gradually slope upwardly as best indicated in Fig. 3 to seat the flanges 24 within the open upper ends of the cans. When the cans have been brought substantially back to the feed side of the apparatus, the tracks 20 again drop to the lesser elevation as best indicated in Fig. 4, the flanges are freed from the cans and the cans are directed out of the driving lugs 13 by a guide 25 that intercepts the path of travel of the cans and they are deposited onto a rotating discharge disk 26' for conveying to some other point in the cannery for subsequent operations.

Disk 5, which is spaced above disk 4, has a pan 26 secured to its upper side. This pan extends at its margin beyond the edge of disk 5 and terminates at its outer edge in an upwardly directed flange 27. The horizontal portion of the margin of this pan that extends outwardly of disk 5 is provided with a plurality of openings 28 disposed vertically over the openings 23 in plate 21 and a plurality of tubular members 29 extend between the openings. Members 29 are preferably of brass, and flanges 30 depending around the edge of openings 28 are fitted within the upper ends of the tubular members and are suitably secured thereto. The inner diameter of members 29 is slightly smaller than that of the openings 23 in plate 21 and the lower end of each of said members terminates over and adjacent the opening in plate 21 disposed therebeneath.

From the foregoing description it is manifest that the cans and tubular members 29 will rotate together upon rotation of hub 6 by gear 10 and any material deposited in the members 29 will pass into cans 15 in the absence of any obstruction.

Mounted above the pan 26 is a half-cone 30' of sheet metal with its semi-circular base disposed adjacent the pan and with its apex substantially in alignment with the axis of the pan. The semi-circular base edge of the cone is spaced radially inwardly of the openings 28 and extends around that portion only of the pan opposite the can feed and can discharge devices, and is at spaced points 32 along the upwardly extending edges of the cone supported from a cross bar 31 that is adjustably secured by clamps 33 to the fixed shaft 7. The upwardly extending edges of the cone are flanged as at 34 to provide for the securing of the cone to the bar 31.

The outer slanted surface of the cone has equally spaced outwardly projecting fins 35 secured thereto, which fins diverge radially downwardly and outwardly from adjacent and slightly below the apex of the cone. The lower ends of the fins adjacent the lower edge of the base of the cone have horizontally projecting extensions 36 that extend from the base of the cone toward their outer ends in the direction of rotation of pan 26. These projecting ends are provided with flexible strips 37 that slidably engage the upper surface of pan 26 as best seen in Fig. 5. These strips are preferably of rubber, but can be of any similar suitable material.

Over the side of the cone adjacent its apex and the upper ends of fins 35 is a discharge conveyor or chute 41 adapted to discharge the pieces of fruit or the like to the side of the cone for distribution by the fins to the spaces between the projections 36, and as the pan revolves it is obvious that the fruit will be forced outwardly of the pan and into the tubular members 29 through openings 28.

It is desirable, however, that none of the fruit be discharged into the cans 15 until the tubular members 29 are filled, these members each being of a size to contain the exact quantity of fruit necessary to fill one of the cans to the desired level. I therefore provide an imperforate fixed plate 38 between the lower ends of tubular members 29 and the open ends of the cans around that half of the pan 26 and plate 21 that is adjacent the semi-circular base of the half-cone 30' so the fruit is obstructed from passing into the cans, but will fill the tubular members 29.

The plate 38 may be annular in form and continue completely around the margin of the pan 26, in which case the half of the plate opposite the above described half thereof is provided with openings 39 in register with the openings in the pan 26 and plate 21 so that upon rotation of the pan and plate in the direction of the arrow in Fig. 1, the fruit will successively drop into the cans at point 40 from the tubular members 29 and the filled cans will then continue for removal from the apparatus by reason of guide 25 and discharge disk 26'. The plate 38 may, of course, merely be semi-annular so as to mask the openings 23 on one half of the plate 21 only, the other half being open.

Plate 38 is supported against rotation by brackets 42 adjustably secured to posts 43 at spaced intervals around the apparatus, the posts being secured at their lower ends in brackets 44 to the frame.

It will also be noted that cross bar 31 is adjustably secured at its ends to posts 45 at opposite sides of the frame by brackets 46.

A certain amount of the fruit on the pan 26 will, of course, be in excess of the amount necessary to fill the members 29, and this is diverted away from the openings 23 by spaced curved guide plates 47, 48 that direct the fruit and juice over the imperforate portion of the plate 26 back to the opposite side of the plate for subsequent deposit into the tubular members, as best indicated in Fig. 1. The lower edges of guide plates 47, 48 are provided with flexible strips 49 engaging the upper surface of the plate 26, and the lower or base edge of the cone 30' is also provided with flexible strips of rubber or similar material 50 that prevents the juice and fruit particles from passing beneath the cone, although if some juice does pass these strips, an inverted funnel-shaped member 51 is provided around the central axis of the pan 26 to prevent juice from getting into the bearings of the several disks. Plate 21 is similarly provided with a generally vertically extending collar 52 around its axis for the same purpose. It will be noted that guide plate 47 is secured to cross arm 31 by depending arm 47', and the ends of plate 48 are secured to the flanges 34 of the cone.

In order to adapt my apparatus to handle cans of different sizes, it will be noted that disk 4 is secured to a sleeve or hub 53 that is threaded at one end to hub 6 as at 54 and secured to hub 6 by a lock nut 55 so the disk 4 and plate 21 can be raised and lowered as desired.

This sleeve 53 is provided with an upwardly extending portion to which is keyed a hub 56 at 57 carrying disk 5 and plate 26, and hub 53 is also keyed at 58 to the main drive hub 6.

In using a different sized can from that indicated in the drawing, I merely substitute a suitably sized disk 5, pan 26 and hub 56 as an assemblage for the size shown in the drawing.

The drawing indicates the apparatus set up for a maximum sized can, and in using it for smaller cans it is obvious that the can driving lugs 13 must be adapted to take the smaller sized can.

To accomplish this, I provide an insert or filler piece 59, (Fig. 7) that is adapted to bolt to the can driving lugs through holes 60, 60' respectively in the filler and driving lugs respectively.

It is also obvious that the guide 19 must be modified to engage the side of the cans for properly aligning the cans on tracks 20. To this end the guide 19 is generally annular in form but with free ends adjacent the can feed and discharge side of the apparatus. This guide is supported by bolts 61 in bracket 62 with a nut on opposite sides respectively of the aperture in each of the brackets through which the bolt extends. By adjusting the nuts, the diameter of the annular guide is reduced or enlarged as desired.

I have described the apparatus as particularly adapted to cooked fruit, and I find that when green or uncooked fruit is used, the apparatus does not require the portion including disk 5 and tubular members 29, therefore these are removed and the cone 30' is lowered until the rubber strips 37, 50 and 49 engage the upper surface of plate 21, and by providing a light solution of syrup as at 63 to the upper end of cone 30', as indicated in Fig. 2, the particles of uncooked fruit are coated with the syrup and they slide rapidly down the side of the cone and directly into the cans without the slightest trouble, readily filling the cans before they pass by the can charging side of the cone. Also, the spray is easily regulated to deposit the proper amount of syrup into the cans to prevent air pockets forming, so that the can is solidly packed when discharged from the apparatus.

It will be seen from the foregoing description that my apparatus is extremely simple and efficient, and is quickly adapted to any kind of fruit, whether cooked or uncooked, and to any size of can with very few adjustments.

Another feature I have noticed in the operation of the apparatus is that the friction between the rubber strips 37 and the pan 26 or plate 21, as the case might be, causes a slight jiggling movement of the pan or plate that tends to give just enough vibration to the plate to assist in shaking the fruit into the tubular members 29 or cans 15, and to insure proper settling of the fruit in said members or cans or both.

Having described my invention, I claim:

1. Apparatus for filling cans with fruit comprising a horizontally disposed plate provided with a circular row of spaced openings therethrough, means for supporting a circular row of cans below said plate with the open ends of the cans in register with the openings in the plate, means for revolving said plate and row of cans together around a common axis, a guide member disposed over said plate arranged and adapted to guide the fruit to said openings, said guide member including a sheet disposed upwardly at a slant to the plane of the plate and terminating at its lower edge adjacent said row of openings, a plurality of ribs on the upper surface of said sheet, said ribs each being positioned with one end thereof adjacent the row of openings and extending from said end in a direction substantially radially of the axis of the plate.

2. Apparatus for filling cans with fruit comprising a horizontally disposed plate provided with a circular row of spaced openings therethrough, means for supporting a circular row of cans below said plate with the open ends of the cans in register with the openings in the plate, means for revolving said plate and row of cans together around a common axis, a guide member disposed over said plate arranged and adapted to guide the fruit to said openings, said guide member comprising a sheet disposed upwardly at a slant to the plane of the plate and terminating at its lower edge adjacent said row of openings, means mounting said sheet against movement relative to said plate, a fruit conveyor arranged and adapted for discharging fruit to the upper outer surface of said sheet and a spray device positioned to discharge fruit syrup onto said sheet.

3. Apparatus for filling cans with fruit comprising a horizontally disposed plate provided with a circular row of spaced openings therethrough, means for supporting a circular row of cans below said plate with the open ends of the cans in register with the openings in the plate, means for revolving said plate and row of cans together around a common central axis, guide means over said plate for directing fruit to the openings comprising a flat sheet bowed in a direction transversely of the axis of the plate and extending upwardly from adjacent the inner side of said row of openings at a slant toward the axis of the plate, means mounting said sheet against movement relative to said plate, a plurality of ribs on the upper surface of said sheet extending radially of the axis of the plate to adjacent said plate at their lower ends and extensions on the lower ends of said ribs projecting over the openings in said plate.

4. Apparatus for filling cans with fruit comprising a horizontally disposed plate provided with a circular row of spaced openings therethrough, means for supporting a circular row of cans below said plate with the open ends of the cans in register with the openings in the plate, means for revolving said plate and row of cans together around a common central axis, guide means over said plate for directing fruit to the openings comprising a flat sheet bowed in a direction transversely of the axis of the plate and extending upwardly at a slant toward the axis of the plate, means mounting said sheet against movement relative to said plate, a plurality of ribs on the upper surface of said sheet extending radially of the axis of the plate to adjacent said plate at their lower ends, extensions on the lower ends of said ribs projecting over said openings and flexible strips secured on said extensions frictionally engaging the upper surface of said plate.

5. Apparatus for filling cans with fruit comprising a horizontally disposed plate provided with a circular row of spaced openings therethrough and an annular imperforate portion adjacent said row, means for supporting a circular row of cans below said plate with the open ends of the cans in register with the openings in the plate, means for revolving said plate together with the row of cans around a central axis, a hemi-conically shaped sheet disposed over said plate with its base edge adjacent the row of openings for directing fruit deposited on the outer side of said sheet to the openings, means fixedly mounting said sheet against revolving with the plate, a guide member positioned over the plate with one end extending over the row of openings at a point adjacent one end of the base of said sheet and the opposite end extending over the row of openings at the opposite end of the base of the sheet and the intermediate portion extending across the imperforate portion of the sheet rearwardly of the sheet whereby the surplus fruit at said row of openings is diverted from a path of travel over said openings across the plate and back to the row of openings.

6. Apparatus for filling cans with fruit comprising a horizontally disposed plate provided with a row of spaced openings spaced from the outer margin of said plate, means for supporting a row of cans below said plate with the open ends of the cans in register with the openings in the plate, means for moving said cans and plate together along a path of travel, a plurality of guide members positioned over said plate arranged and adapted to guide the fruit pieces in a direction angularly of the path of travel of the openings to a plurality of said openings for dropping therethrough, said guide members terminating inwardly of the outer margin of said plate for providing for movement with the plate of any surplus fruit deposited on the outer margin of said plate and past said guide members when the plate is moved, and means mounting said guide members against movement relative to said plate and cans.

7. Apparatus for filling cans with fruit comprising a horizontally disposed plate provided with a circular row of spaced openings therethrough and an annular imperforate portion adjacent said row, means for supporting a circular row of cans below said plate with the open ends of the cans in register with the openings in the plate, means for revolving said plate together with the row of cans around a common central axis, a hemi-conically shaped sheet disposed over said plate with its base edge adjacent the row of openings for directing fruit deposited on the outer side of said sheet to the openings, means fixedly mounting said sheet against revolving with the plate, means arranged and adapted to feed a quantity of fruit directly onto the outer side of said sheet at a point spaced from the base edge thereof whereby the fruit is conveyed downwardly by gravity on said sheet toward said openings, and means for directing a portion of the fruit over said imperforate portion of the plate from a point at one side of the apparatus to over the openings in the plate at the other side of the apparatus.

8. In apparatus of the character described, means for supporting a horizontally disposed circular row of vertically positioned cans in spaced relation for movement around a circular path of travel including a fixed horizontally disposed track supporting the row of cans axially centered thereon, a plurality of driving lugs adapted to engage the inner sides of the row of cans and an annular ring outwardly spaced from the driving lugs adapted to slidably engage the outer sides of the row of cans, separate means associated with the ring and driving lugs respectively arranged and adapted to reduce the space between the ring and lugs whereby the ring and lugs are adapted to coact to engage the outer and inner sides of rows of cans of lesser size while maintaining the row of lesser sized cans respectively axially centered on said track.

GEORGE D. GARDNER.